United States Patent [19]

Zizola

[11] Patent Number: 5,322,187
[45] Date of Patent: Jun. 21, 1994

[54] AUTOMATIC DISPENSER FOR ICE CREAM CAKE AND THE LIKE

[75] Inventor: Corrado Zizola, Treviso, Italy

[73] Assignee: Fadis, S.R.L., Vincenza, Italy

[21] Appl. No.: 934,745

[22] Filed: Oct. 9, 1992

[30] Foreign Application Priority Data

Apr. 9, 1990 [IT]  Italy ................................. 45720 A/90

[51] Int. Cl.⁵ ............................................ G07F 11/72
[52] U.S. Cl. ........................ 221/150 R; 221/97;
221/155; 221/196; 221/210; 221/256; 221/265;
221/270; 221/DIG. 1
[58] Field of Search .............. 221/150 R, 150 HC, 75,
221/DIG. 1, 155, 191, 196, 97, 119, 133, 134,
210, 224, 225, 247, 256, 13, 14, 263, 265, 270, 27

[56] References Cited

U.S. PATENT DOCUMENTS

| | | |
|---|---|---|
| 2,524,673 | 10/1950 | Martin . |
| 2,674,728 | 4/1954 | Potter ........................ 221/DIG. 1 X |
| 2,728,306 | 12/1955 | Tarr . |
| 3,003,437 | 10/1961 | Taylor et al. . |
| 3,590,750 | 7/1971 | Lamy . |
| 3,838,791 | 10/1974 | Raitt . |
| 3,876,110 | 1/1975 | Logie . |
| 4,252,250 | 2/1981 | Toth ....................... 221/13 |
| 4,548,581 | 10/1985 | Huffman ................... 433/64 |
| 4,560,088 | 12/1985 | Tan ........................... 221/75 |
| 4,762,250 | 8/1988 | Friberg .................... 221/224 X |
| 4,762,483 | 8/1988 | Zevlakis . |
| 4,812,629 | 3/1989 | O'Neil et al. ............ 221/13 X |
| 4,823,984 | 4/1989 | Ficken ................... 221/150 HC X |
| 4,995,498 | 2/1991 | Menke ................... 221/133 X |
| 5,025,950 | 6/1991 | Trouteaud et al. ..... 221/150 R X |
| 5,048,719 | 9/1991 | Empl et al. ............ 221/133 X |

FOREIGN PATENT DOCUMENTS

| | | |
|---|---|---|
| 0288142 | 10/1988 | European Pat. Off. ...... 221/150 HC |
| 2248050 | 4/1974 | Fed. Rep. of Germany . |
| 1421655 | 11/1965 | France ...................... 221/210 |
| 61-155107 | 7/1986 | Japan . |
| 1284995 | 11/1989 | Japan ....................... 221/133 |
| 311494 | 1/1991 | Japan ....................... 221/196 |
| 574178 | 12/1945 | United Kingdom . |

Primary Examiner—D. Glenn Dayoan
Assistant Examiner—Dean A. Reichard
Attorney, Agent, or Firm—Hoffman, Wasson & Gitler

[57] ABSTRACT

An automatic dispenser for ice cream cakes having a taking unit mounted in a shop window on a movable structure with respect to the product being dispensed. The unit includes a shovel on a structure movable in three orthogonal directions.

17 Claims, 6 Drawing Sheets

AUTOMATIC DISPENSER FOR ICE CREAM CAKE AND THE LIKE

BACKGROUND OF THE INVENTION

The present invention refers to an automatic dispenser for ice-cream cakes and like.

At present the sale of ice-cream cakes foresees the preservation of the ice-cream cakes in a packet corresponding to the single portion and the sale of such a packet to the customer requiring it.

U.S. Pat. No. 3,838,791 describes an automatic dispenser of spherical-shaped prepackaged ice-creams, inserted into a package inside which the scooped ice-creams are aligned. The packages are supported on an endless belt conveyor which disposes each package in front of an ejecting mechanism which gets out from it one-by-one the scooped ice-cream and discharges outwardly.

U.S. Pat. No. 3,590,750 describes an automatic dispenser for ice-cream comprising a scoop mechanism supported on a structure which is solely vertically movable with respect to an underlying turntable. A plurality of mechanisms is provided to take ice-cream from a bulk ice-cream supply disposed on the turntable and to transport the scoped ice-cream to an empty cone placed on a cone support.

U.S. Pat. No. 3,876,110 describes an automatic machine for dispensing ice-cream cones and comprising a plurality of storage tanks and extrusion tanks from which the ice-cream is discharged and cut off with wire loops and placed on a cone to be transferred outwardly.

An aim of the invention is to realize an automatic dispenser for predivided ice-cream cakes and the like.

This and further aims which will be apparent from the following description are attained according to the invention through an automatic dispenser for ice-cream cakes and the like as disclosed in claim 1.

BRIEF DESCRIPTION OF THE DRAWINGS

The present invention is hereinafter further clarified with reference to the enclosed drawings in which.

DETAILED DESCRIPTION OF THE DRAWINGS

Figure 1:
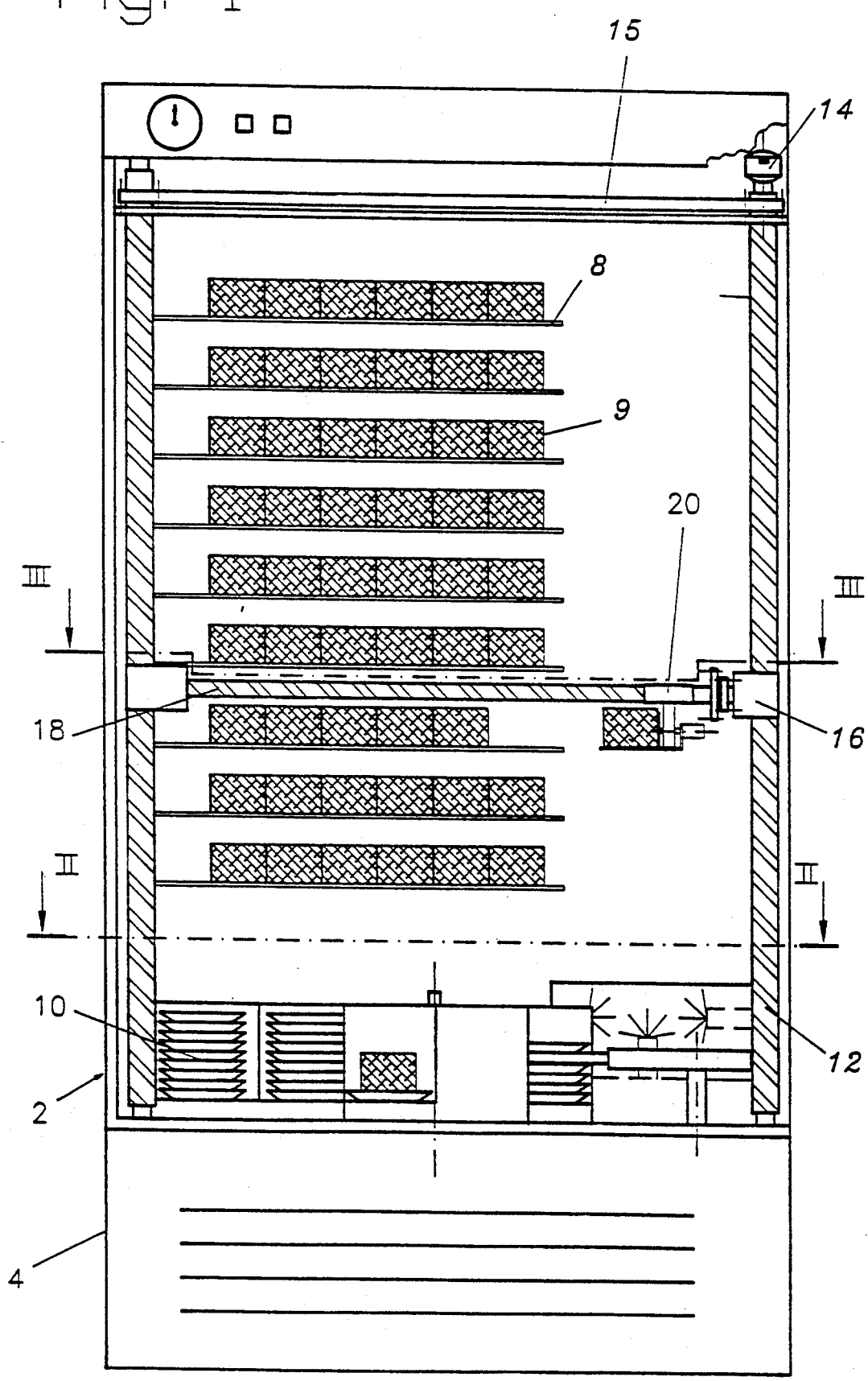
FIG. 1 schematically shows in side view an automatic dispenser for ice-cream cakes according to the invention.
Figure 2:
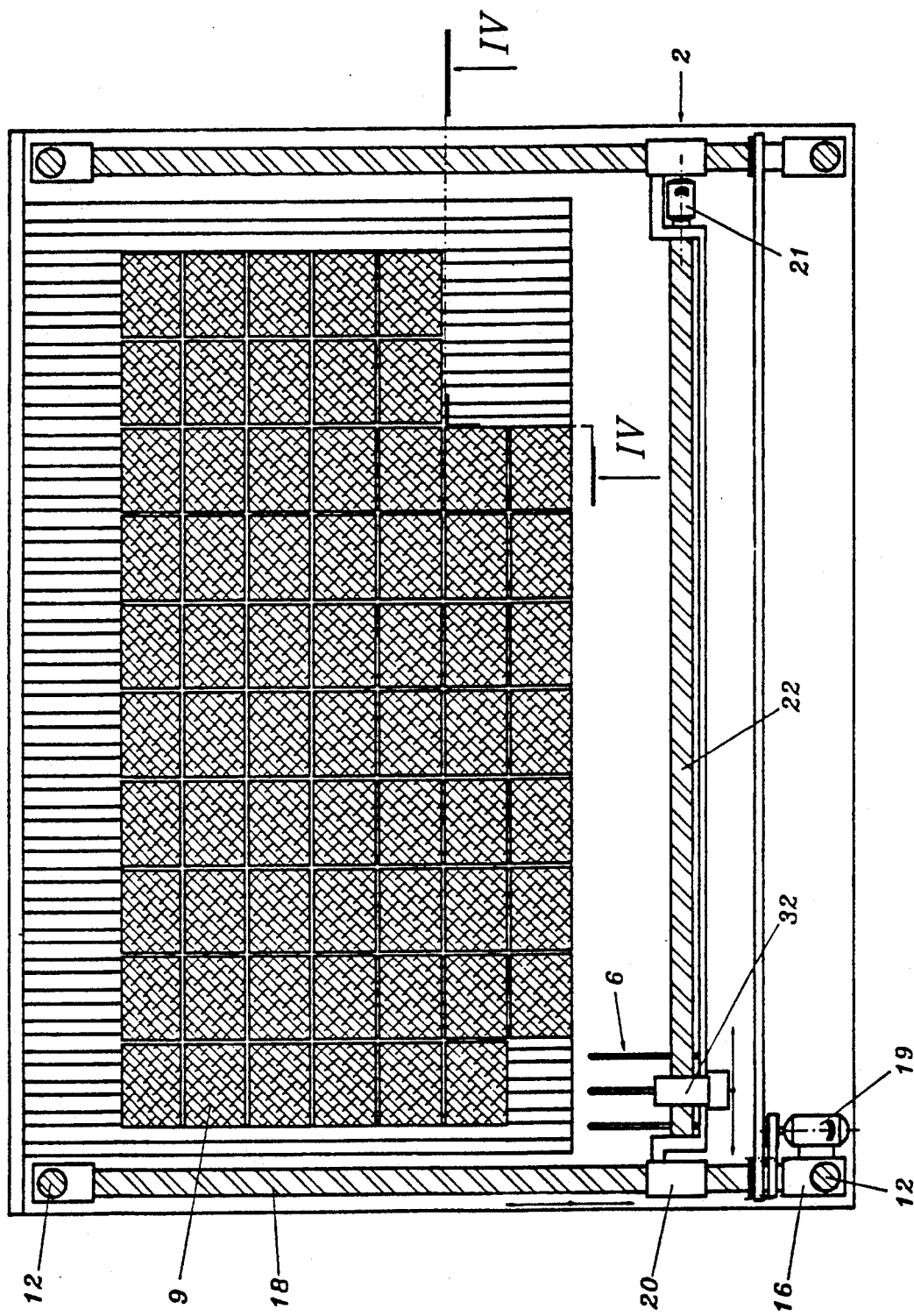
FIG. 2 shows it along the section II—II of FIG. 1.
Figure 3:
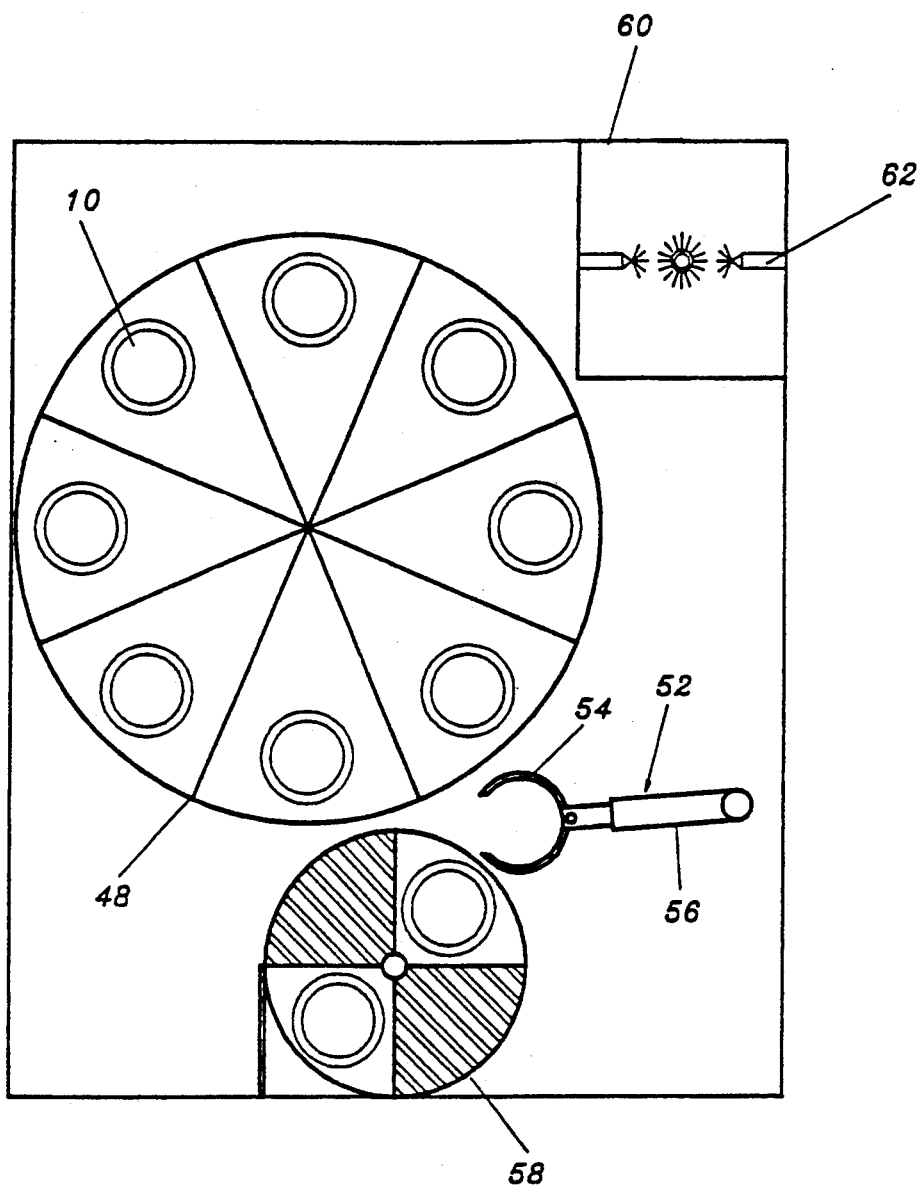
FIG. 3 shows it along the section III—III of FIG. 1.
Figure 4:
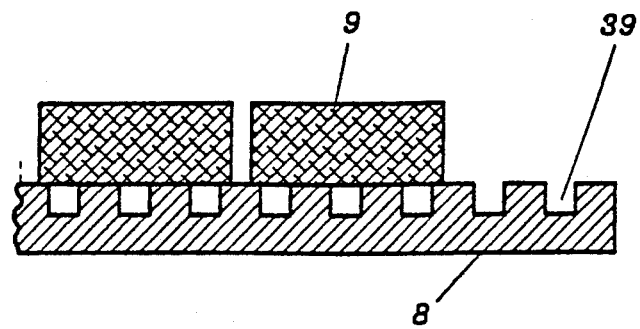
FIG. 4 shows it along the section IV—IV of FIG. 2.
Figure 5:
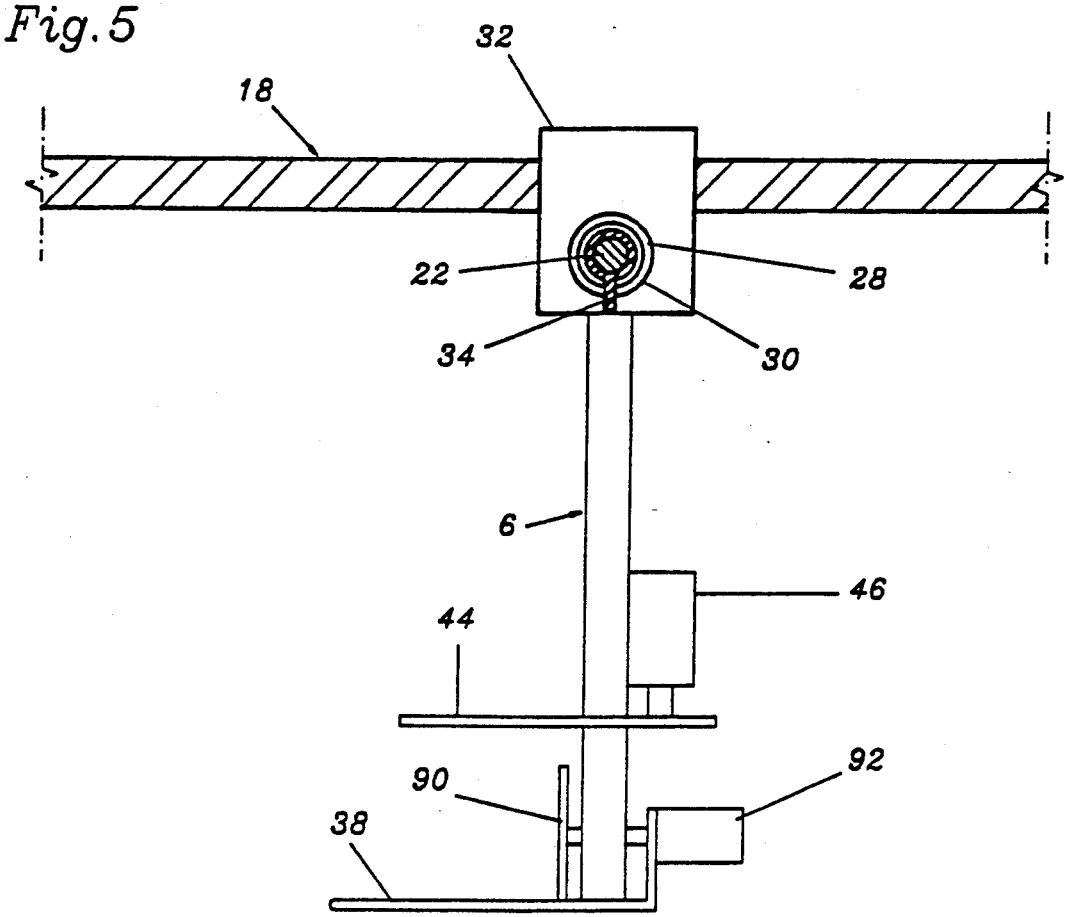
FIG. 5 shows in side view the enlarged particular of the taking unit.

As it can be seen from the drawings, the dispenser apparatus according to the invention comprises a vertical refrigerant structure with a substantially parallelepipedic shop window 2, mounted on an underlying container 4 in which the refrigerant apparatus is housed, which keeps the temperature at the inside of the shop window 2 in the conditions suitable to correctly preserve the ice-cream cakes.

The shop window 2 is substantially divided into two zones: an upper one, which can be called the operating zone of a taking unit 6 of the ice-cream cakes 9, and the parking area for little basins or trays 8 containing the various sorts of ice-cream cakes already separated in the various portion and a lower one forming the parking area for stacks of plates 10, the washing area of the taking unit 6 and the dispenser area of the ice-cream cakes.

Close to the corner of the shop window 2 there are provided four guides 12 formed by four shafts provided with a helical groove. One of the four shafts 12 is rotated by an electric step-by-step motor 14 and the other shafts are coupled to the first shaft through a toothed belt link 15 to ensure their synchronism in rotation.

On said guides 12, corresponding carriages 16 slide, connected two by two through a further guide, even formed by a shaft 18 provided with a helical groove and driven by another electric step-by-step motor 19. On each of said guides 18 corresponding carriages 20 slide, connected to each other through a further guide, even formed by a shaft 22 provided with a helical groove and driven by a further step-by-step motor 21. This transverse guide 22 is surrounded by an external tubular guide 28, provided with a rectilinear longitudinal groove 30, having the purpose, as it will be later clarified, of preventing the rotation of a transverse carriage 32, mounted on the shaft 22, and of allowing at the same time its displacement from one end to the other of the guide. For this purpose the transverse carriage 32 is provided with a portion 34 projecting downwards and passing through the rectilinear groove 30 of said external tubular guide 28.

The taking unit 6 of the ice-cream cakes to be dispensed is supported by the transverse carriage 32 and at the lower end it is provided with a horizontal three prongs shovel 38.

The shovel 38 can have either converging edges 40, to take from a circular cake a segment portion, or parallel edges to take from a guadrangular cake a quadrangular portion. Obviously with an opportune choice of the sizes, it is possible to also utilize a shovel 38 having converging edges to take quadrangular portions and vice versa.

Figure 8:
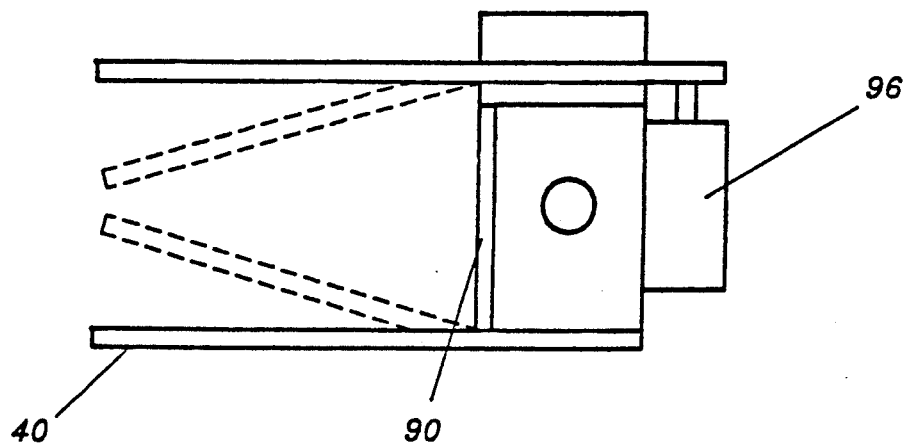
FIG. 8 shows in plan view the enlarged particular of the taking unit.

In FIG. 8 a plan view of a different shovel is shown, essentially consisting of a pair of sideboard 40, one of which is movable with respect to the other on command of an actuator 96.

Also in this case, as in the precedent one, the sideboards 40 can be convergent (cf. dotted lines) or parallel.

The shovel is also provided with an upper presser 44 vertically actuated by an actuator 46 and with a pusher 90 actuated by an actuator 92.

The parking zone of plates 10 comprises a rotating support 48, subdivided into a plurality of circular sections each housing a stack of plates. To this support a taking unit 52 is faced. This is formed by a vice 54 mounted on a telescopic arm 56 movable between a taking position of the lowest plate 10 of the stack, and a receiving position of the portion of ice-cream cake. Near this position a rotating box 58 is foreseen for transferring the ice-cream cake product outside the shop window 2. This box 58 has the function of preventing the direct connection between the inside and the outside of the shop window and this with the double purpose of avoiding any contamination of the products housed at the inside of the shop window and of avoiding at the same time any thermic loss.

The box 58 is placed in the operating zone of the taking unit 6, and a washing station is foreseen in a zone different from this. It is substantially formed by a small basin 60 provided with nozzles 62 spraying a washing liquid and with a drain for the liquid which washed the taking unit.

All the motors and actuators which actuate the various part are independently driven and controlled by a microprocessor, which co-ordinates their operation according to a prefixed operating program, which will be described herebelow.

To better understand the operating of the dispenser according to the invention it is preferable to start, for simplicity reasons, with reference to a rest condition in which:

all trays 8, each containing ice-cream cakes, are stacked in the parking area of the shop window 2, the taking unit 6 is in a prefixed stand-by position, in correspondence to the underlying washing area, the arm 56 of the vice 54 is provided, with an empty plate between its jaws.

At this time, if a customer wishes an ice-cream cake, he puts the corresponding amount in a traditional collection and counting device and from a suitable keyboard gives the necessary information corresponding to the desired ice-cream cake.

For this purpose the memory of the system, which had memorized the co-ordinates of the last taking of such a sort of ice-cream cake, orders the taking unit 6 to displace one step from the previous one, to allow it to take an adjacent portion of ice-cream cake. These instructions start the automatic taking cycle, which foresees that the motor 14 is energized, which causes rotating the four vertical grooved shafts 12 and then moving the corresponding longitudinal carriages 16 until the shovel 38 is positioned on a transverse zone of the ice-cream cakes containing the portion to be taken; then the motor 14 is stopped and the motor 21 is energized, which causes advancing the transverse carriage 32 along said transverse zone of ice-cream cake until the taking unit 6 is positioned faced the portion to be taken. Then the motor 21 is stopped and the motor 19 is energized which causes advancing the carriages 20 along the shafts 18 until the shovel 38 engages with its three prongs the portion. For this purpose each vessel 8 is provided with longitudinal parallel grooves 39 spaced apart of a distance corresponding to that of the prongs.

At the end of this phase a command is given to the motors which drive back the descent of the carriages 16 along the shafts 12 to move the longitudinal carriages 20 along the shafts 18 and the shovel 38 above the plate 10 in stand-by position in the dispensing station, where it was brought by the vice 54.

When this dispensing phase is ended, from one hand the suitable orders are given to the actuators of the shovel 38 for its transferring to the washing station, and from the other hand an order is given to the vice 54 to transfer the plate 10 into the box 58, whose subsequent rotation of 180° allows the customer standing at the outside of the shop window to take the packaged ice-cream cake.

In the meantime a jet of liquid causes the washing of the shovel 38 for preparing the dispenser to the subsequent operating cycle, which starts with the new request by the customer.

Figure 6:
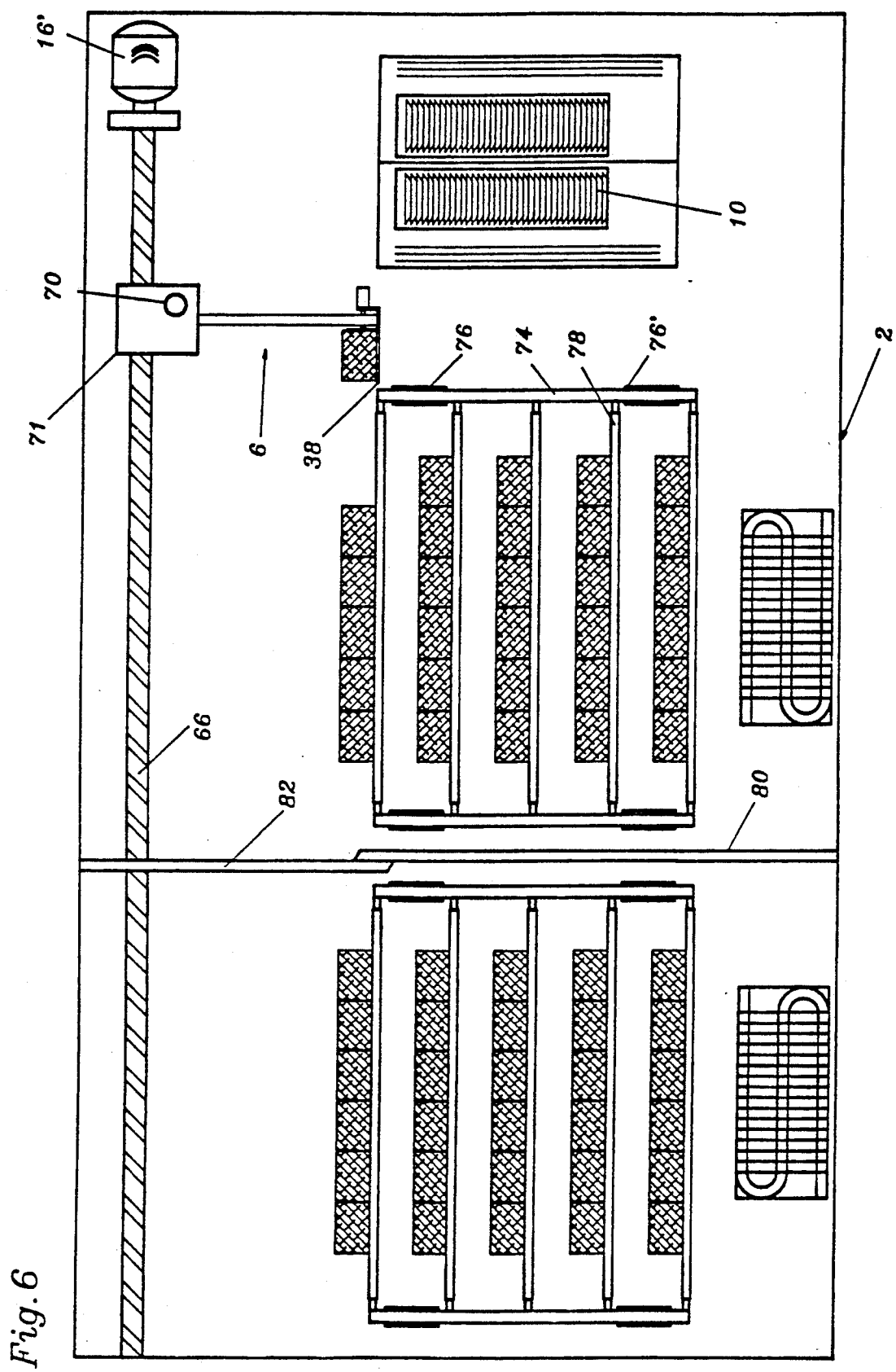
FIG. 6 schematically shows in side view an automatic dispenser for ice-cream cakes in a different embodiment.

In the embodiment shown in FIG. 6, close to the two upper longitudinal edges of the shop window 2 there are provided, near the operating zone of the taking unit 6, two guides 66 formed by two shafts provided with a helical groove. One of the two shaft 66 is rotated by an electric step-by-step motor 16' and the other shaft is coupled to the first shaft through a toothed belt link to ensure their synchronism in rotation.

On said guides 66, corresponding carriages slide, connected to each other through a further guide 70 provided with a a helical groove and driven by another electric step-by-step motor. This transverse guide 70 is surrounded by an external tubular guide like the guide 22 and along which a carriage 71 slides. The shop window 2 houses at its inside a pair of continuous vertical conveyors, each comprising a pair of chains 74 guided by pinions 76, 76' and a plurality of hanging shelves 78 supporting trays or basins containing the ice-cream cakes. At least a pinion 76' of each chain 74 is rotated by a step-by-step motor (not shown).

The two continuous vertical conveyors are separated by a screen 80, which doesn't extend for the whole height of the shop window 2, but ends at a certain height from the upper cover to not obstacle the movements of the taking unit 6.

To the screen 80 a wall 82 is connected, which is vertically movable on command of an actuator (not shown) to cause the complete closure of the two areas, housing the two distinct conveyors and therefore to allow the maintenance in such areas of different climatic conditions.

The movements of this wall 82 according to the displacements of the taking unit 6 is controlled by the same microprocessor.

The dispenser according to this second embodiment operates as follows.

Depending on the chosen ice-cream cake, an order given by the microprocessor to the motor driving the pinions 76', actuates the chains 74 until the hanging shelf 78, on which the basin 8 containing the chosen ice-cream cake is placed, reaches the highest point of its run and here it stops awaiting that the shovel 38 takes away from the basin a portion of ice-cream cake to be put on the plate 10 before being dispensed to the outside.

Figure 7:
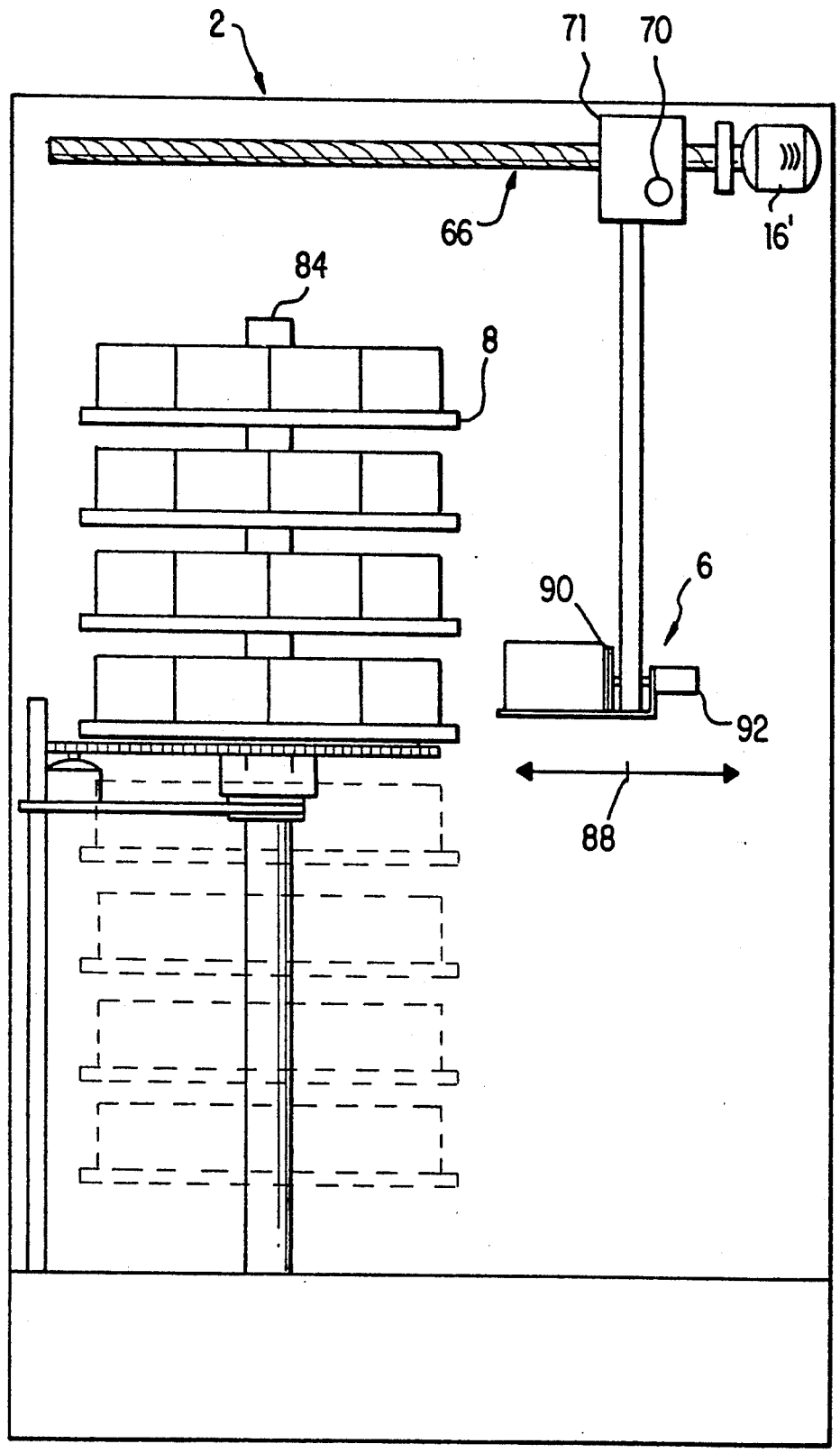
FIG. 7 schematically shows in side view an automatic dispenser for ice-creams in a third embodiment.

In the embodiment shown in FIG. 7, the components of the various zones of the shop window 2 are constructively different. In particular in the parking area of a plurality of trays 8 are foreseen mounted on a vertical support 84 axially translable and rotating.

The trays 8 have circular shape and the shovel 38 doesn't require any transverse displacement along the shaft 70, but only a longitudinal displacement along the middle plane of the shop window 2 according to the direction shown by the arrow 88.

The dispenser according to this embodiment operates as follows:

when the customer has given to the keyboard the instructions corresponding to the desired sort of ice-cream cake, firstly the axial movement of the vertical support 84 is ordered, so as to place the tray 8 containing such an ice-cream cake at the same level of the shovel. Then a further order given to the motor 161 causes the shovel 38 to advance until it takes away a portion of ice-cream cake, and to bring it in the dispensing area, in which such a portion is placed on the plate.

The microprocessor has memorized this taking away, so that at the request of a further portion of the same ice-cream cake, the support 84 is caused to rotate of such an angle to face to the shovel 38 a new portion to be taken.

In the case the trays 8 mounted on the support 84 are rectangular, such a support must not rotate, while the shovel 38 must be displaced laterally of a step in a way similar to the previous embodiments.

I claim:

1. An automatic dispenser for ice-cream cakes and the like, comprising a taking unit (6) mounted within a shop window (2) on a structure movable with respect to the product to be dispensed, characterized in that the taking unit (6) comprises a shovel (38) mounted on a structure movable in three orthogonal directions with respect to a plurality of ice-cream cakes predivided into single portions and placed on superimposed trays (8,78) and is controlled by means acting on said structure or on said trays to move said shovel with respect to a preselected tray to sequentially remove the adjacent portions of the ice-cream cakes (9) placed on said tray and to transfer them one by one to a dispensing station, characterized in that the shovel (38) comprises a presser (44) vertically movable with respect to a plane surface of the same shovel (38) and cooperating with this to clamp a portion of the cake to be taken.

2. An automatic dispenser according to claim 1, characterized in that the shovel (38) of the taking unit 6) is provided with a pair of sideboards (40), at least one of which being horizontally movable with respect to the other.

3. An automatic dispenser according to claim 2, characterized in that the sideboards (40) are converging.

4. An automatic dispenser according to claim 2, characterized in that the sideboards (40) are parallel.

5. An automatic dispenser according to claim 1, characterized in that the support structure of the shovel (38) is mounted on a carriage (32) movable along a transverse guide (22) supported at its ends by two carriages (20) movable horizontally simultaneously along four longitudinal guides (18) supported at its ends by two carriages (16) movable vertically simultaneously along from vertical guides (12) and is provided with means to independently cause the movements of the carriages (16,20,32) along the respective guides.

6. An automatic dispenser according to claim 1, characterized in that the trays (78) are mounted on at least one continuous conveyor (74) stopping a selected tray (78) in a taking position near to the shovel (38).

7. An automatic dispenser according to claim 1, characterized in that the superimposed trays (8) are vertically movable or rotatable around a vertical axis to face a portion of the cake to be taken to the shovel (38).

8. An automatic dispenser according to claim 1, characterized in that the superimposed trays (8) are housed in at least two different environments, in which different climatic conditions are kept.

9. An automatic dispenser according to claim 1, characterized in that the shovel (38) of the taking unit (6) is provided with a pusher (90), movable in parallel to a surface of said shovel.

10. An automatic dispenser according to claim 1, characterized in that the shovel (38) of the taking unit (6) has converging edges.

11. An automatic dispenser according to claim 1, characterized in that the shovel (38) of the taking unit (6) has parallel edges.

12. An automatic dispenser according to claim 1, characterized in that the support structure of the shovel (38) is mounted on a carriage (71) movable along a transverse guide (70) supported at its ends by two carriages movable simultaneously along two longitudinal guides (66) and is provided with means (16') to independently cause the movements of the transverse carriage (71) or of longitudinal carriages along the respective guides (66).

13. An automatic dispenser for ice-cream cakes and the like, comprising a taking unit (6) mounted within a shop window (2) on a structure movable with respect to the product to be dispensed, characterized in that the taking unit (6) comprises a shovel (38) mounted on a structure movable in three orthogonal directions with respect to a plurality of ice-cream cakes predivided into single portions and placed on superimposed trays (8,78) and is controlled by means acting on said structure or on said trays to move said shovel with respect to a preselected tray to sequentially remove the adjacent portions of the ice-cream cakes (9) placed on said tray and to transfer them one by one to a dispensing station, characterized in that it further comprises at the inside of the shop window (2) a separating member (52) for stacked plates and means for transferring the same from a storing zone to the dispensing station for receipt of the portions of ice-cream cake removed from said preselected tray.

14. An automatic dispenser according to claim 13, characterized in that the separating members comprise a vice (54) supported by a telescopic (56) arm movable between a taking position of one plate from the stack and the delivery position of the portion of ice-cream cake on said plate.

15. An automatic dispenser according to claim 14, characterized in that near to a delivery position, a two position rotating box (58) is provided to put into communication said plate with the inside or the outside respectively of the shop window (2).

16. An automatic dispenser according to claim 13, characterized in that the shovel (38) is provided with three prongs spaced apart for a distance corresponding to that of grooves (39) provided on the upper surface of the trays (8,78).

17. An automatic dispenser for ice-cream cakes and the like, comprising a taking unit (6) mounted within a shop window (2) on a structure movable with respect to the product to be dispensed, characterized in that the taking unit (6) comprises a shovel (38) mounted on a structure movable in three orthogonal directions with respect to a plurality of ice-cream cakes predivided into single portions and placed on superimposed trays (8,78) and is controlled by means acting on said structure or on said trays to move said shovel with respect to a preselected tray to sequentially remove the adjacent portions of the ice-cream cakes (9) placed on said tray and to transfer them one by one to a dispensing station, characterized in that the superimposed trays (8) are housed in at least two different environments, in which different climatic conditions are kept, and that the two environments are kept separate by a screen (80), provided with a passage that can be opened to allow movements of the shovel (38) from one environment to the other.

* * * * *